(12) United States Patent
Picot

(10) Patent No.: US 10,883,431 B2
(45) Date of Patent: Jan. 5, 2021

(54) MANAGING TORQUE DELIVERY DURING DYNAMIC FUEL MANAGEMENT TRANSITIONS

(71) Applicant: GM GLOBAL TECHNOLOGY OPERATIONS LLC, Detroit, MI (US)

(72) Inventor: Nathan M. Picot, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/138,054

(22) Filed: Sep. 21, 2018

(65) Prior Publication Data
US 2020/0095950 A1     Mar. 26, 2020

(51) Int. Cl.
*F02D 41/00* (2006.01)
*F02D 13/06* (2006.01)
*F02D 17/00* (2006.01)

(52) U.S. Cl.
CPC ..... *F02D 41/0087* (2013.01); *F02D 41/0002* (2013.01); *F02D 13/06* (2013.01); *F02D 17/00* (2013.01); *F02D 2041/002* (2013.01); *F02D 2041/0012* (2013.01); *F02D 2200/0406* (2013.01); *F02D 2200/101* (2013.01); *F02D 2200/1004* (2013.01); *F02D 2250/21* (2013.01)

(58) Field of Classification Search
CPC ................ F02D 2041/0012; F02D 2250/21
See application file for complete search history.

(56) References Cited

U.S. PATENT DOCUMENTS

| | | |
|---|---|---|
| 5,715,794 A | 2/1998 | Nakamura et al. |
| 6,279,551 B1 * | 8/2001 | Iwano ............... F02B 37/18 |
| | | 123/564 |
| 6,513,471 B1 | 2/2003 | Hicks |
| 6,557,518 B1 | 5/2003 | Albertson et al. |
| 6,584,942 B1 | 7/2003 | Albertson et al. |
| 6,585,621 B2 | 7/2003 | Matthews et al. |
| 6,655,353 B1 | 12/2003 | Rayl |

(Continued)

OTHER PUBLICATIONS

Coordination between Driveline Dynamic Control and Air-Fuel Management, Research Disclosure, Dec. 17, 2014, ISSN 0374-4353, Ireland.

(Continued)

*Primary Examiner* — Kevin R Steckbauer

(57) ABSTRACT

An engine control system, vehicle system, and method are provided that are arranged to direct dynamically fuel management of an engine. The engine is operated a first firing fraction, a first cam phase, and a first throttle control position. A desired second firing fraction and a desired second cam phase are then determined. A torque request and a throttle area are determined. Further, a desired second throttle control position is determined based on at least the throttle area, the torque request, the desired second firing fraction, and the desired second cam phase. The method, control system, and vehicle system are configured to transition from the first firing fraction to the desired second firing fraction while transitioning from the first throttle control position to the desired second throttle control position. As such, delivered torque can be accurately controlled without the need for spark retard during the transition between firing fractions.

17 Claims, 5 Drawing Sheets

(56) References Cited

U.S. PATENT DOCUMENTS

| | | | |
|---|---|---|---|
| 6,715,289 B2 | 4/2004 | Mader | |
| 6,732,506 B2 | 5/2004 | Patterson et al. | |
| 6,739,314 B1 | 5/2004 | Bauerle et al. | |
| 6,760,656 B2 | 7/2004 | Matthews et al. | |
| 6,763,297 B1 | 7/2004 | Stahl et al. | |
| 6,966,287 B1 | 11/2005 | Livshiz et al. | |
| 7,004,141 B2 | 2/2006 | Matthews et al. | |
| 7,059,998 B2 | 6/2006 | Bolander et al. | |
| 7,090,048 B2 | 8/2006 | Albertson et al. | |
| 7,232,401 B2 | 6/2007 | Albertson | |
| 7,246,673 B2 | 7/2007 | Vahabzadeh et al. | |
| 7,308,959 B2 | 12/2007 | Roberts | |
| 7,530,413 B2 | 5/2009 | Rayl | |
| 7,918,212 B2 | 4/2011 | Verdejo et al. | |
| 8,112,215 B2 | 2/2012 | Wang et al. | |
| 8,176,896 B2 | 5/2012 | Verdejo et al. | |
| 8,326,519 B2 | 12/2012 | Mcdonald et al. | |
| 8,352,156 B2 | 1/2013 | Mcdonald | |
| 8,392,096 B2 | 3/2013 | Mathews et al. | |
| 8,473,179 B2 | 6/2013 | Whitney et al. | |
| 8,532,908 B2 | 9/2013 | Morgan et al. | |
| 8,550,055 B2 | 10/2013 | Ferch et al. | |
| 8,612,124 B2 | 12/2013 | Verdejo et al. | |
| 8,662,035 B1 | 3/2014 | Hendriksma | |
| 8,758,282 B2 | 6/2014 | Malhi et al. | |
| 8,979,708 B2 | 3/2015 | Burtch | |
| 9,051,871 B1 | 6/2015 | Wu et al. | |
| 9,080,522 B2 | 7/2015 | Spix et al. | |
| 9,086,020 B2 * | 7/2015 | Pirjaberi | F02D 13/06 |
| 9,091,187 B2 | 7/2015 | Clever et al. | |
| 9,120,478 B2 * | 9/2015 | Carlson | B60W 10/06 |
| 9,140,622 B2 | 9/2015 | Beikmann | |
| 9,163,568 B2 | 10/2015 | Sczomak et al. | |
| 9,169,787 B2 | 10/2015 | Brennan | |
| 9,175,628 B2 | 11/2015 | Livshiz et al. | |
| 9,200,587 B2 * | 12/2015 | Serrano | F02D 45/00 |
| 9,222,427 B2 | 12/2015 | Matthews et al. | |
| 9,239,024 B2 | 1/2016 | Beikmann | |
| 9,249,747 B2 | 2/2016 | Matthews | |
| 9,249,748 B2 | 2/2016 | Verner | |
| 9,284,894 B2 | 3/2016 | Orban et al. | |
| 9,284,903 B2 | 3/2016 | Gehringer et al. | |
| 9,341,128 B2 | 5/2016 | Hayman et al. | |
| 9,365,158 B2 | 6/2016 | Barlow, Jr. et al. | |
| 9,376,973 B2 | 6/2016 | Brennan et al. | |
| 9,382,853 B2 | 7/2016 | Phillips | |
| 9,399,959 B2 | 7/2016 | Whitney et al. | |
| 9,416,736 B2 | 8/2016 | Bergkoetter et al. | |
| 9,416,743 B2 | 8/2016 | Beikmann | |
| 9,429,081 B2 | 8/2016 | Moscherosch et al. | |
| 9,441,550 B2 | 9/2016 | Li et al. | |
| 9,458,778 B2 | 10/2016 | Rayl et al. | |
| 9,458,779 B2 | 10/2016 | Brennan et al. | |
| 9,458,780 B2 | 10/2016 | Burleigh et al. | |
| 9,494,092 B2 | 11/2016 | Liu et al. | |
| 9,512,749 B2 | 12/2016 | Pierik | |
| 9,528,446 B2 * | 12/2016 | Pirjaberi | F02D 17/02 |
| 9,534,550 B2 | 1/2017 | Matthews et al. | |
| 9,556,811 B2 | 1/2017 | Wagh et al. | |
| 9,599,047 B2 | 3/2017 | Beikmann et al. | |
| 9,611,769 B2 | 4/2017 | Pierik et al. | |
| 9,624,847 B2 | 4/2017 | Kim et al. | |
| 9,638,121 B2 | 5/2017 | Rayl | |
| 9,650,978 B2 | 5/2017 | Phillips | |
| 9,719,439 B2 | 8/2017 | Brennan et al. | |
| 9,726,139 B2 | 8/2017 | Beikmann | |
| 9,738,285 B1 | 8/2017 | Schang et al. | |
| 9,745,905 B2 * | 8/2017 | Pirjaberi | F02D 41/0002 |
| 9,777,656 B1 | 10/2017 | Bowman | |
| 9,796,372 B2 | 10/2017 | Choi et al. | |
| 9,803,573 B2 | 10/2017 | Naik et al. | |
| 9,845,752 B2 | 12/2017 | Verdejo et al. | |
| 9,850,834 B2 | 12/2017 | Keating | |
| 9,863,293 B2 | 1/2018 | Pierik | |
| 9,874,167 B2 | 1/2018 | MacEwen et al. | |
| 9,878,718 B2 * | 1/2018 | Serrano | B60W 10/06 |
| 9,903,283 B1 | 2/2018 | Rayl, Jr. et al. | |
| 9,926,868 B2 * | 3/2018 | Serrano | B60W 10/06 |
| 9,945,329 B2 | 4/2018 | Wu | |
| 9,964,051 B2 * | 5/2018 | Pirjaberi | F02D 13/06 |
| 9,964,064 B1 | 5/2018 | Cribbins et al. | |
| 10,094,300 B2 | 10/2018 | Cygan, Jr. et al. | |
| 10,094,312 B2 | 10/2018 | Brennan et al. | |
| 10,094,313 B2 * | 10/2018 | Serrano | F02P 5/1504 |
| 10,107,211 B2 * | 10/2018 | Pirjaberi | F02D 17/02 |
| 10,161,513 B2 | 12/2018 | Jammulamadaka | |
| 10,183,672 B2 | 1/2019 | Kromrey et al. | |
| 10,190,481 B2 | 1/2019 | Levijoki et al. | |
| 10,221,787 B2 * | 3/2019 | Banker | F02D 11/02 |
| 10,227,939 B2 | 3/2019 | Rayl | |
| 10,247,121 B2 * | 4/2019 | Shost | F02D 41/2422 |
| 10,267,376 B2 | 4/2019 | Samie et al. | |
| 10,337,441 B2 * | 7/2019 | Matthews | F02D 41/0002 |
| 2013/0092127 A1 * | 4/2013 | Pirjaberi | F02D 13/06 123/406.23 |
| 2013/0092128 A1 * | 4/2013 | Pirjaberi | F02D 17/02 123/406.23 |
| 2013/0289853 A1 * | 10/2013 | Serrano | F02D 11/105 701/110 |
| 2014/0045652 A1 * | 2/2014 | Carlson | F02D 41/0087 477/109 |
| 2014/0352300 A1 | 12/2014 | Keating | |
| 2015/0203062 A1 | 7/2015 | Gautama et al. | |
| 2015/0260117 A1 * | 9/2015 | Shost | F02D 17/02 123/481 |
| 2015/0260286 A1 | 9/2015 | Laws et al. | |
| 2016/0053697 A1 * | 2/2016 | Pirjaberi | F02D 17/02 123/406.45 |
| 2016/0363083 A1 * | 12/2016 | Matthews | F02D 41/2461 |
| 2017/0023094 A1 | 1/2017 | Bai | |
| 2017/0030257 A1 | 2/2017 | Wu et al. | |
| 2017/0067401 A1 * | 3/2017 | Pirjaberi | F02D 17/02 |
| 2017/0306864 A1 * | 10/2017 | Pirjaberi | F02D 37/02 |
| 2017/0369063 A1 * | 12/2017 | Serrano | B60W 10/023 |
| 2017/0370309 A1 * | 12/2017 | Serrano | B60W 10/023 |
| 2018/0135544 A1 | 5/2018 | Kalweit et al. | |
| 2018/0179970 A1 * | 6/2018 | Serrano | F02P 5/1504 |
| 2018/0216541 A1 * | 8/2018 | Pirjaberi | F02D 17/02 |
| 2018/0298838 A1 | 10/2018 | Pisu et al. | |
| 2018/0313281 A1 * | 11/2018 | Nakano | F02D 41/307 |
| 2018/0363566 A1 * | 12/2018 | Banker | F02D 17/02 |
| 2019/0048806 A1 | 2/2019 | Whitney et al. | |
| 2019/0048814 A1 * | 2/2019 | Nakano | F02D 41/0087 |
| 2019/0249608 A1 * | 8/2019 | Nakano | F02D 41/0087 |

OTHER PUBLICATIONS

U.S. Appl. No. 16/149,194, titled "Predictive Torque Management for Powertrain Having Continuous Actuators and Multiple Discrete Modes," filed on Oct. 2, 2018 by GM Global Technology Operations LLC.

* cited by examiner

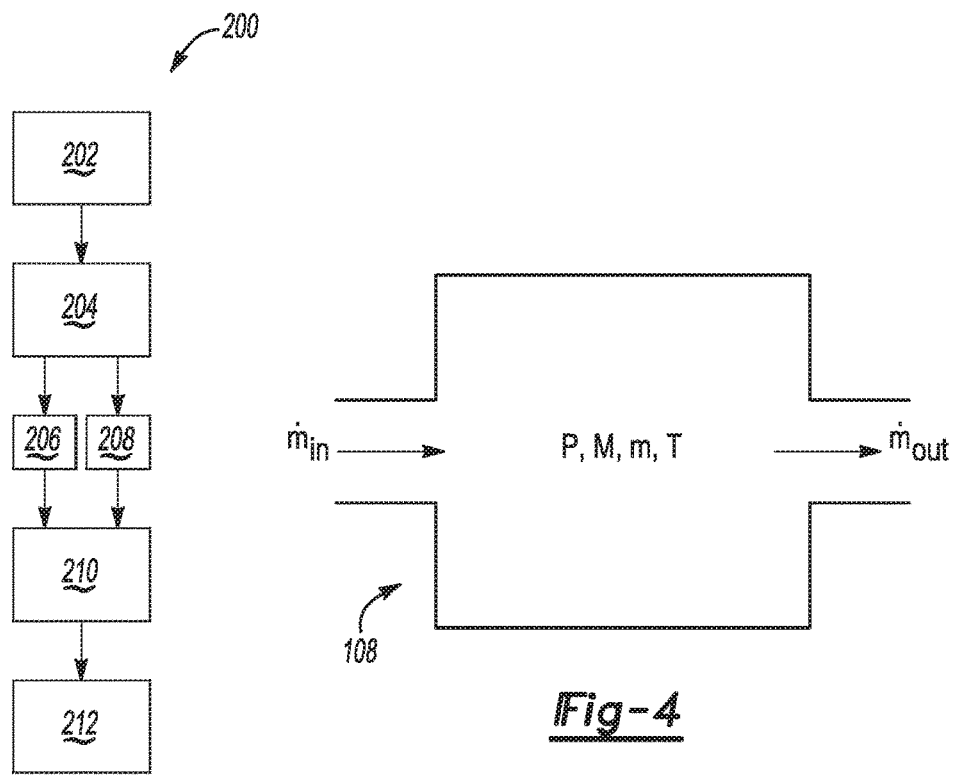
Fig-3
Fig-4
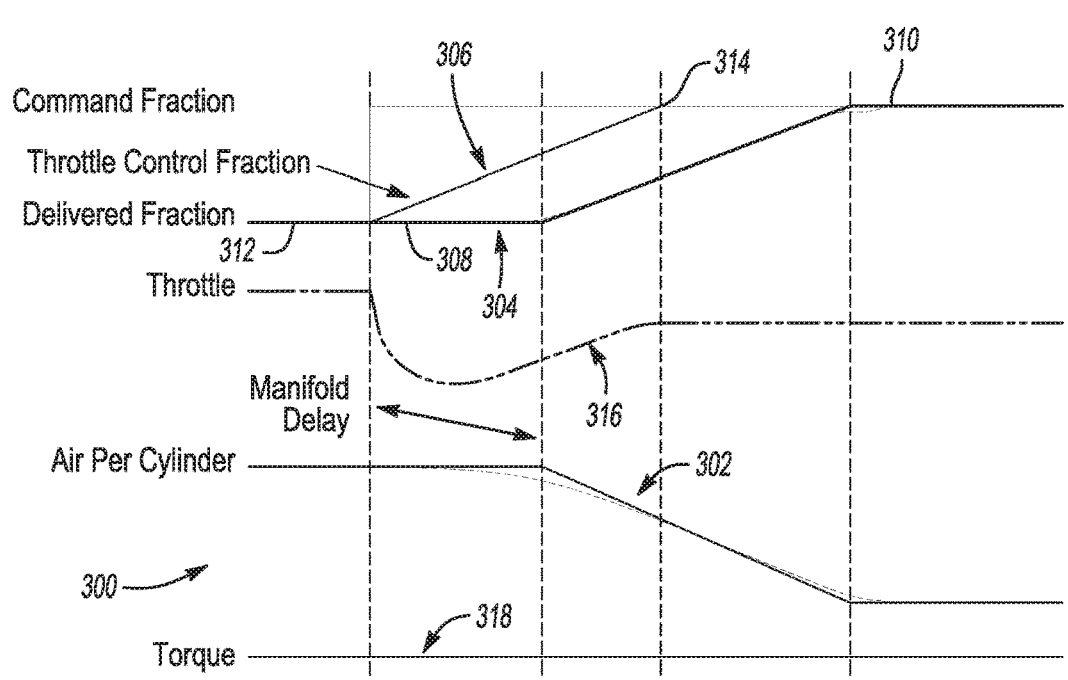
Fig-5

MANAGING TORQUE DELIVERY DURING DYNAMIC FUEL MANAGEMENT TRANSITIONS

FIELD

The present disclosure relates generally to methods and arrangements for controlling vehicle actuators during firing fraction transitions in a dynamic fuel management controlled engine.

INTRODUCTION

Modern vehicles utilize many actuators, controlling various aspects of vehicle operation. Many of these actuators control engine operation, such as throttle, cam phase, fuel injection, and spark timing. Other actuators control delivery of the engine torque to a vehicle's wheels, such as a torque converter or a transmission. Operation of these actuators must be coordinated to achieve acceptable vehicle performance. In particular, it is desirable to control a vehicle to provide optimum fuel efficiency with acceptable NVH (noise, vibration, harshness) performance.

Fuel efficiency of many types of internal combustion engines can be substantially improved by varying the displacement of the engine. This allows for the full torque to be available when required, yet can significantly reduce pumping losses and improve thermodynamic efficiency through the use of a smaller displacement when full torque is not required. The most common method of varying the displacement today is deactivating a group of cylinders substantially simultaneously. In this approach, no fuel is delivered to the deactivated cylinders and their associated intake and exhaust valves are kept closed as long as the cylinders remain deactivated.

Another engine control approach that varies the effective displacement of an engine is referred to as dynamic fuel management (DFM). With DFM, cylinders are fired as needed in any pattern or combination. Thus, a particular cylinder may be fired during one engine cycle and then may not be fired during the next engine cycle and then selectively fired or not fired during the next. DFM engine operation is distinguished from conventional variable displacement engine control in which a designated set of cylinders are deactivated substantially simultaneously and remain deactivated as long as the engine remains in the same variable displacement mode. Thus, the sequence of specific cylinders firings will always be exactly the same for each engine cycle during operation in a variable displacement mode (so long as the engine remains in the same displacement mode), whereas that is often not the case during DFM operation. For example, an 8 cylinder variable displacement engine may deactivate half of the cylinders (i.e. 4 cylinders) so that it is operating using only the remaining 4 cylinders. Commercially available variable displacement engines available today typically support only two or at most three fixed displacement modes. However, with DFM operation, any number of the 8 cylinders may be firing in a given engine cycle.

In general, DFM engine operation facilitates finer control of the effective engine displacement than is possible using a conventional variable displacement approach. For example, firing every third cylinder in a 4 cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using DFM, although in practice most implementations restrict operation to a set of available or desirable firing fractions, sequences or patterns.

Many DFM controllers are arranged to provide a set of available firing patterns, sequences or firing fractions. In some circumstances, the set of available firing patterns or fractions will vary as a function of various operating parameters such as engine load, engine speed, and/or transmission gear. Typically, the available firing patterns are selected, in part, based on their NVH characteristics. Transitions between firing fraction levels must be managed to avoid unacceptable NVH during the transition. In particular, changes in the firing fraction must be coordinated with other engine actuators to achieve smooth firing fraction transitions.

Many internal combustion engines incorporate a cam phaser to adjust a cam angle or phase relative to the crankshaft. Adjusting the cam phase varies the relative timing of the opening and closing of the intake and/or exhaust valves relative to top dead center (TDC) or some other crankshaft reference point. The cam phase impacts both the cylinder mass air charge (MAC) and the amount of residual exhaust gases left in the cylinder from the preceding cylinder working cycle. The cam phase can be set to provide optimum fuel efficiency (or other desired characteristics), however the optimal cam phase varies as a function of the engine speed and the cylinder load. Therefore, the fuel efficiency of an engine may generally be improved by varying the cam phase based on the engine operating conditions.

In addition to cam phase, there are other actuators and control systems in modern vehicles that impact fuel efficiency and occupant comfort. One such system is control of the torque converter slip. The torque converter transfers motive power between the vehicle's engine and wheels. Torque converter slip indicates the difference in rotational velocity between the input, engine side, of the torque converter and the output, wheel side, of the torque converter. For fuel efficiency, it is desirable to minimize or eliminate slip; however, slip also helps isolate NVH during firing fraction transitions.

When a transition is made between different firing fractions (or variable displacement states) there is typically a corresponding need or desire to change certain engine or vehicle operating parameters such as air charge, fuel charge, spark timing, drivetrain slip, etc. This is because at any particular firing density, there will be associated operating parameters that are appropriate to most efficiently deliver the desired engine output while maintaining desired performance and passenger comfort standards. Therefore, when a change is made in the firing density, it is desirable to concurrently adjust one or more selected engine operating parameters and/or drivetrain characteristics so that the desired engine output and vehicle performance is maintained both throughout the transition and at the new firing fraction. Without such an adjustment, operating at the same engine settings would typically result in the generation of more torque than desired when the firing density is increased, and less torque than desired when the firing density is reduced.

From a control standpoint, the firing density can be changed very quickly by simply altering the selection of the specific cylinders to be fired—however corresponding changes in the air charge tend to be realized more slowly due to the latencies inherent in changing the cam phase, filling or emptying the intake manifold, etc. This is particularly noticeable when the desired firing fraction changes significantly, as for example when transitioning from a firing fraction of 1 to ½ or from ⅔ to ⅓, which requires correspondingly large changes in air charge. Generally, any mismatch between the firing density and the targeted cylinder air charge during a transition will result in a low frequency torque disturbance (unless otherwise compensated for), which may be perceived as NVH. If the mismatch would result in a torque surge, then in the past, typically control schemes would implement spark timing retardation to maintain the desired torque. However, an undesirable side effect of retarding spark to reduce engine output is that retarding spark will generally reduce fuel efficiency. Also, excessive spark retard could lead to misfires further reducing efficiency and potentially adversely affecting the engine performance.

To maximize fuel economy, it is desirable to manage torque delivery without reducing spark advance. Any reduction in spark advance from the "mean best torque" value equates to lost energy. Further, any desirable control system must be robust to sudden changes in torque request and other noise factors.

SUMMARY

The present disclosure provides a method and controller that controls delivered torque during firing fraction transitions through throttle control. The accurate amount of throttle control may be determined by calculating a desired manifold pressure, which is determined based on a torque request, a throttle area, a desired firing fraction (or firing fraction change), a cam phase, and in some instances, engine speed. As such, delivered torque can be accurately controlled without the need for spark retard during the transition between firing fractions.

In one form, which may be combined with or separate from the other forms disclosed herein, a method of controlling an engine system to deliver a requested engine output torque is provided. The method includes operating an engine at a first firing fraction, a first cam phase, and a first throttle control position, and determining a desired second firing fraction and a desired second cam phase, where the desired second firing fraction being different than the first firing fraction. The method also includes determining a torque request and determining a throttle area. The method further includes determining a desired second throttle control position based on at least the throttle area, the torque request, the desired second firing fraction, and the desired second cam phase, and the method includes completing a firing fraction transition from the first firing fraction to the desired second firing fraction while completing a throttle transition from the first throttle control position to the desired second throttle control position, each of the firing fraction transition and the throttle transition being completed with a predetermined relationship with respect to each other.

In another form, which may be combined with or separate from the other forms disclosed herein, an engine control system is arranged to direct dynamically fuel management of an engine. The engine system has at least one controller and is configured to operate the engine at a first firing fraction, a first cam phase, and a first throttle control position; determine a desired second firing fraction and a desired second cam phase, the desired second firing fraction being different than the first firing fraction; determine a torque request; determine a throttle area; determine a desired second throttle control position based on at least the throttle area, the torque request, the desired second firing fraction, and the desired second cam phase; and complete a firing fraction transition from the first firing fraction to the desired second firing fraction while completing a throttle transition from the first throttle control position to the desired second throttle control position, wherein each of the firing fraction transition and the throttle transition are completed with a predetermined relationship with respect to each other.

In yet another form, which may be combined with or separate from the other forms disclosed herein, a vehicle system includes an engine having a plurality of pistons, each piston slidable within a cylinder bore, and a cam configured to control the flow of air and fuel into each cylinder bore. The vehicle system also has a throttle configured to control a flow of fluid into the engine. Further, the vehicle system has a control system having at least one controller and being configured to: operate the engine at a first firing fraction, the cam at a first cam phase, and the throttle at a first throttle control position; determine a desired second firing fraction and a desired second cam phase, the desired second firing fraction being different than the first firing fraction; determine a torque request; determine a throttle area through the throttle, the throttle area being selectively variable; determine a desired second throttle control position based on at least the throttle area, the torque request, the desired second firing fraction, and the desired second cam phase; and complete a firing fraction transition from the first firing fraction to the desired second firing fraction while completing a throttle transition from the first throttle control position to the desired second throttle control position, wherein each of the firing fraction transition and the throttle transition are completed with a predetermined relationship with respect to each other.

Additional optional features may be provided, including but not limited to the following: the method and/or control system being configured to implement a delivered torque that is substantially the same as the torque request while transitioning from the first firing fraction to the second firing fraction; the method and/or control system being configured to determining an engine speed, and wherein determining the desired second throttle control position is further based on the engine speed; wherein the desired second firing fraction is determined based on at least the torque request, a manifold pressure, a transition over-torque estimation, and the delivered torque; the transition over-torque estimation being defined as an extra amount of torque that would have been applied at the second firing fraction without transitioning to the desired second throttle control position; the method and/or control system being configured to determine a first manifold pressure at the first firing fraction and a desired second manifold pressure at the second firing fraction, the desired second manifold pressure being based on the torque request, the second throttle control position being controlled based on the desired second manifold pressure, and the desired second manifold pressure being controlled based on at least the throttle area, the torque request, the desired second firing fraction, and the desired second cam phase; wherein transitioning from the first firing fraction to the desired second firing fraction is performed while proportionally transitioning from the first throttle control position to the desired second throttle control position; and wherein at least one of the first firing fraction and the desired second firing fraction is selected from the following group of firing fractions: ⅛, 1/7, ⅙, ⅕, ¼, ⅓, 2/7, 2/5, ⅔, ⅜, 3/7, ⅗, ¾, 4/7, ⅘, 5/9, ⅝, 5/7, ⅚, 6/7, 7/9, ⅞, and 8/9.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The drawings are intended for illustration purposes only, and not intended to limit the invention, its applicability, or its uses.

The invention and the advantages thereof, may best be understood by reference to the following description taken in conjunction with the accompanying drawings in which:

FIG. 3 is a block diagram illustrating a method of controlling an engine system to deliver a requested engine output torque, in accordance with the principles of the present disclosure;

FIG. 4 is a schematic illustration of a manifold, according to the principles of the present disclosure;

FIG. 5 is a graph illustrating various vehicle parameters as a function of time, in accordance with the principles of the present disclosure;

Figure 1:
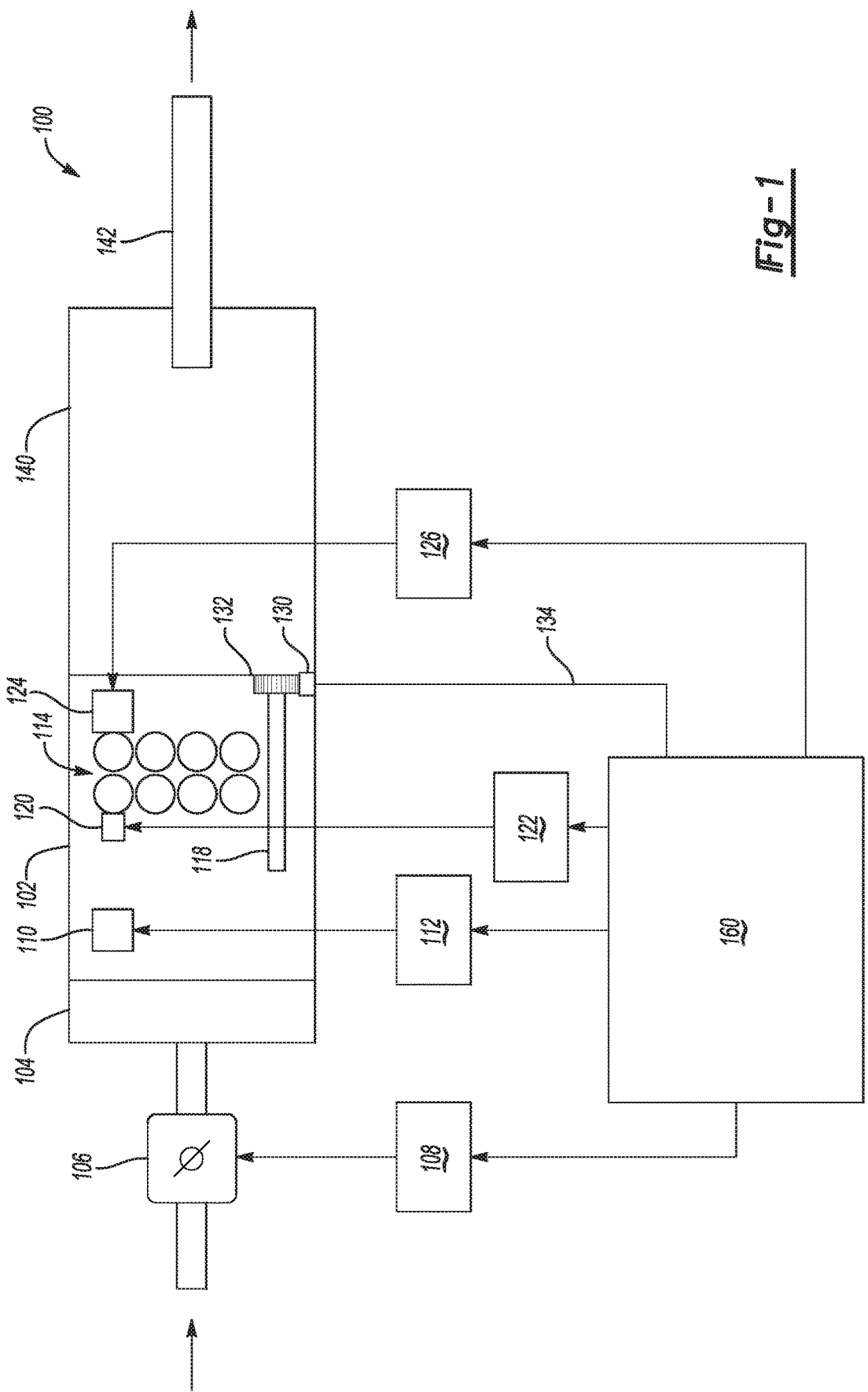
FIG. 1 is a functional block diagram of a vehicle propulsion system including a control system, in accordance with the principles of the present disclosure.

It should also be appreciated that the depictions in the figures are diagrammatic and not to scale.

DETAILED DESCRIPTION

The following description is merely illustrative in nature and is in no way intended to limit the disclosure, its application, or uses. For purposes of clarity, the same reference numbers will be used in the drawings to identify similar elements. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring now to FIG. 1, a functional block diagram of an example vehicle propulsion system is presented and generally designated at 100. An engine 102 generates torque for a vehicle. Air is drawn into the engine 102 through an intake manifold 104. Airflow into the engine 102 may be varied by a throttle, or throttle valve, 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injector(s).

The engine 102 has a plurality of cylinders 114, each of which includes a piston (not shown) coupled to a crankshaft 118. When each piston moves by combustion within its own cylinder 114, each piston slides within its respective cylinder bore 114 and moves the crankshaft 118. Although the engine 102 is depicted as including eight cylinders 114, the engine 102 may include any desired number of cylinders 114, such as two, three, four, six, or eight, by way of example. One cylinder combustion cycle of one cylinder 114 may include four strokes: an intake stroke, a compression stroke, an expansion stroke, and an exhaust stroke; thus, a cylinder combustion cycle is the four stroke event of a single cylinder, whether or not the cylinder actually results in firing or combustion. One engine cycle includes each of the pistons moving within each cylinder 114 once, whether or not the particular cylinder fires. Accordingly, a cylinder combustion cycle is defined as a single cycle of a piston within one cylinder through the four strokes, and an engine cycle is defined to include the completion of the individual cycles for all of the cylinders being used (which may include every cylinder in the engine, or merely a portion of the cylinders, as determined by the active fuel management sy stem).

During the intake stroke, a piston is lowered to a bottom most position, and the air and fuel may be provided to the cylinder 114. The bottom-most position may be referred to as a bottom dead center (BDC) position. During the compression stroke, the piston moves toward a top-most position, thereby compressing the air/fuel mixture within the cylinder 114. The top-most position may be referred to as a top dead center (TDC) position. A spark plug 120 may ignite the air/fuel mixture in various types of engines for each cylinder (only one spark plug 120 is shown, though each cylinder 114 may have its own spark plug). A spark actuator module 122 controls the spark plug 120.

Combustion of the air/fuel mixture drives the piston back toward the BDC position during the expansion stroke, thereby rotatably driving the crankshaft 118. The rotational force (i.e., torque) may be a source of compressive force for a compression stroke of a combustion cycle of a next cylinder in a predetermined firing order. Exhaust gas resulting from the combustion of the air/fuel mixture is expelled from the cylinder 114 during the exhaust stroke. A camshaft phaser 124 controls opening of the intake and/or exhaust valve(s) of each of the cylinders 114. More specifically, the camshaft phaser 124 controls rotation of a camshaft (not shown) to control opening of the intake and/or exhaust valve(s). A phaser actuator module 126 controls the camshaft phaser 124.

A crankshaft position sensor 130 monitors an N-toothed wheel 132 and generates a crankshaft position signal 134 based on rotation of the N-toothed wheel 132. For example only, the crankshaft position sensor 130 may include a variable reluctance (VR) sensor or another suitable type of crankshaft position sensor. The N-toothed wheel 132 rotates with the crankshaft 118. The N-toothed wheel 132 includes space for N equally spaced teeth.

The crankshaft position sensor 130 generates a pulse in the crankshaft position signal 134 each time when a tooth of the N-toothed wheel 132 (e.g., rising or falling edge of the tooth) passes the crankshaft position sensor 130. Accordingly, each pulse in the crankshaft position signal 134 may correspond to an angular rotation of the crankshaft 118 by an amount equal to 360° divided by N. For example only, the N-toothed wheel 132 may include space for 60 equally spaced teeth (i.e., N=60), and each pulse in the crankshaft position signal 134 may therefore correspond to approximately 6° of crankshaft rotation. In various implementations, one or more of the N teeth may be omitted. For example only, two of the N teeth may be omitted in various implementations.

The engine 102 transfers torque to a transmission 140. The transmission 140 may include a manual type transmission, an automatic type transmission, an auto-manual type transmission, or another suitable type of transmission. The transmission 140 may transfer torque to one or more wheels (not shown) via a transmission output shaft 142 and a driveline (not shown).

While the rotational distance between consecutive teeth of the N-toothed wheel 132 should be equal (e.g., 6° in the above example), the rotational distances between consecutive teeth may vary. The variation may be due to, for example, manufacturing tolerances, part-to-part variation, wear, sensor variation, and/or one or more other sources.

An engine control unit (ECU) 70 (or any suitable controller or control system) selectively learns the distance between each pair of consecutive teeth of the N-toothed wheel 132. Based on the learned distances and the crankshaft position signal 134, the ECU 70 generates a second crankshaft position signal. The ECU 70 generates an engine speed signal based on the second crankshaft position signal. The engine speed signal at a given crankshaft position indicates the instantaneous engine speed, or crankshaft rotational speed, at the crankshaft position. In other variations, the determination of the second crankshaft position signal could be omitted, and the ECU 70 may generate the engine speed signal based directly from the first crankshaft position signal 134.

Figure 2:
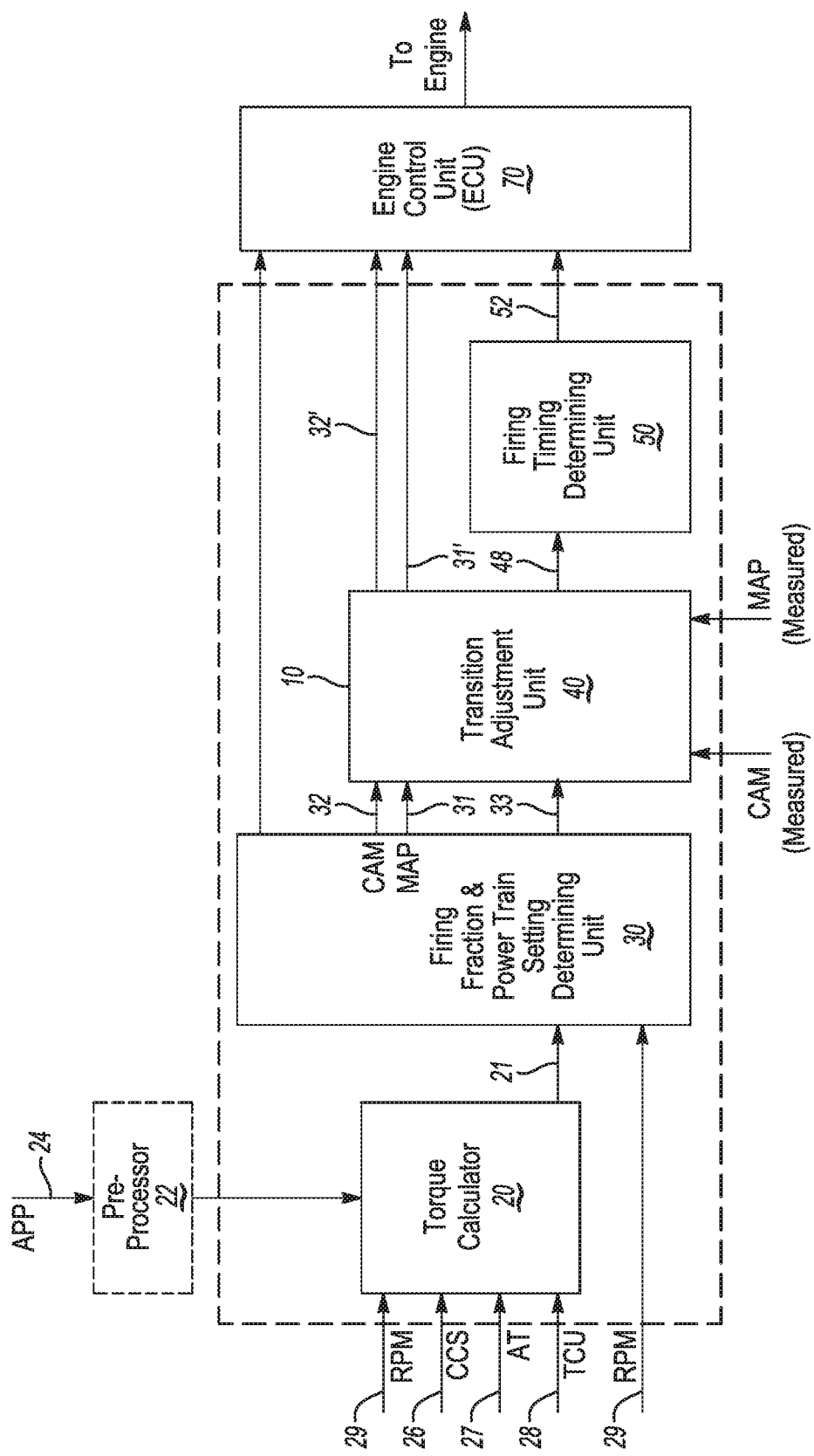
FIG. 2 is a functional block diagram of a DFM control system, according to the principles of the present disclosure.

Referring now to FIG. 2, a controller 10 is configured to implement dynamic fuel management (DFM). The illustrated DFM controller 10 includes a torque calculator 20, a firing fraction and powertrain settings determining unit 30, a transition adjustment unit 40, and a firing timing determination unit 50. For the purposes of illustration, the DFM controller 10 is shown separately from powertrain control unit or engine control unit (ECU) 70, which implements the commanded firings and provides the detailed component controls. However, the functionality of the DFM controller 10 may be incorporated into the ECU 70.

The torque calculator 20 is arranged to determine the desired engine torque at any given time, based on a number of inputs. The torque calculator 20 outputs a requested torque 21 to the firing fraction and power train settings determining unit 30. The firing fraction and powertrain settings determining unit 30 is arranged to determine a firing fraction that is suitable for delivering the desired torque based on the current operating conditions and outputs a desired operational firing fraction 33 that is appropriate for delivering the desired torque. Unit 30 may also determine selected engine operating settings (e.g., manifold pressure 31, cam timing 32, torque converter slip 35, and the like) that are appropriate to deliver the desired torque at the designated firing fraction.

In many implementations, the firing fraction and engine and power train settings determining unit 30 selects between a set of predefined firing fractions which are determined to have relatively good NVH characteristics. However, transitions between operational firing fractions can be a source of undesirable NVH. Transition adjustment unit 40 is arranged to adjust the commanded firing fraction and certain engine settings (e.g., camshaft phase, throttle plate position, intake manifold pressure, torque converter slip) during transitions in a manner that helps mitigate some of the transition associated NVH.

The firing timing determining unit 50 is responsible for determining the specific timing of firings to deliver the desired firing fraction. The firing sequence can be determined using any suitable approach. For example, the firing decisions may be made dynamically on an individual firing opportunity by firing opportunity basis, which allows desired changes to be implemented very quickly. In one example, the firing timing determining unit 50 employs a sigma delta converter, which is well suited for making firing decisions on a firing opportunity by firing opportunity basis. In other examples, pattern generators or predefined patterns may be used to facilitate delivery of the desired firing fraction.

The torque calculator 20 receives a number of inputs that may influence or dictate the desired engine torque at any time. In automotive applications, one of the primary inputs to the torque calculator is the accelerator pedal position (APP) signal 24, which indicates the position of the accelerator pedal. The accelerator pedal position signal 24 may be received directly from an accelerator pedal position sensor (not shown), or an optional preprocessor 22 may modify the accelerator pedal signal 24 prior to delivery to the DFM controller 10, by way of example. Other primary inputs may come from other functional blocks such as a cruise controller (CCS command 26), a transmission controller (AT command 27), and a traction control unit (TCU command 28), by way of example. There are also a number of factors such as engine speed that may influence the torque calculation. When such factors are utilized in the torque calculations, the appropriate inputs, such as engine speed (RPM signal 29) are also provided or are obtainable by the torque calculator 20 as necessary.

In some examples, it may be desirable to account for energy/torque losses in the drive train and/or the energy/torque required to drive engine accessories, such as the air conditioner, alternator/generator, power steering pump, water pumps, vacuum pumps and/or any combination of these and other components. In such examples, the torque calculator 20 may be arranged to either calculate such values or to receive an indication of the associated losses so that they can be appropriately considered during the desired torque calculation.

The nature of the torque calculation will vary with the operational state of the vehicle. For example, during normal operation, the desired torque or torque request may be based primarily on the driver's input, which may be reflected by the accelerator pedal position signal 24. When operating under cruise control, the torque request may be based primarily on the input from a cruise controller. When a transmission shift is imminent, a transmission shifting torque calculation may be used to determine the desired torque during the shifting operation. When a traction controller or the like indicates a potential loss of traction event, a traction control algorithm may be used to determine the torque request as appropriate to handle the event. In some circumstances, depression of a brake pedal may invoke specific engine torque control. When other events occur that require measured control of the engine output, appropriate control algorithms or logic may be used to determine the torque request throughout such events. In any of these situations, the required torque determinations may be made in any manner deemed appropriate for the particular situation. For example, the appropriate torque determinations may be made algorithmically, using lookup tables based on current operating parameters, using appropriate logic, using set values, using stored profiles, using any combinations of the foregoing and/or using any other suitable approach. The torque calculations for specific applications may be made by the torque calculator 20 itself, or by other components (within or outside the ECU 70) and simply reported to the torque calculator 20 for implementation.

The firing fraction and powertrain settings determining unit 30 receives the requested torque signal 21 from the torque calculator 20 and other inputs such as engine speed 29 and various powertrain operating parameters and/or environmental conditions that are useful in determining an appropriate operational firing fraction 33 to deliver the requested torque under the current conditions. Powertrain parameters include, but are not limited to, throttle position, cam phase angle, fuel injection timing, spark timing, torque converter slip, and transmission gear. The firing fraction is indicative of the fraction or percentage of firings that are to be used to deliver the desired output. The firing fraction may be considered as an analog input into a sigma-delta converter. Often, the firing fraction determining unit 30 will be constrained to a limited set of available firing fractions, patterns, or sequences that have been selected based at least in part on their relatively more desirable NVH characteristics (collectively, "the set of available firing fractions"). There are a number of factors that may influence the set of available firing fractions. These typically include the requested torque, cylinder load, engine speed (e.g. RPM), vehicle speed, and current transmission gear. Other factors may potentially also include various environmental conditions, such as ambient pressure or temperature and/or other selected powertrain parameters. The firing fraction determining aspect of unit 30 is arranged to select the desired operational firing fraction 33 based on such factors and/or any other desired factors.

The number of available firing fractions/patterns and the operating conditions during which they may be used may be widely varied based on various design goals and NVH considerations. In one example, the firing fraction determining unit 30 may be arranged to limit available firing fractions to a set of 29 possible operational firing fractions—each of which is a fraction having a denominator of 9 or less—i.e., 0, 1/9, 1/8, 1/7, 1/6, 1/5, 2/9, 1/4, 2/7, 1/3, 3/8, 2/5, 3/7, 4/9, 1/2, 5/9, 4/7, 3/5, 5/8, 2/3, 5/7, 3/4, 7/9, 4/5, 5/6, 6/7, 7/8, 8/9 and 1. However, at certain (indeed most) operation conditions, the set of available firing fraction may be reduced. In general, the set of available firing fractions tends to be smaller in lower gears and at lower engine speeds. For example, there may be operating ranges (e.g. near idle and/or in first gear) where the set of available firing fractions is limited to just two available fractions—(e.g., 1/2 or 1) or to just 4 possible firing fractions—e.g., 1/3, 1/2, 2/3 and 1. Of course, in other examples, the permissible firing fractions/patterns for different operating conditions may be widely varied.

Depending on the nature of the engine, the air charge can be controlled in a number of ways. In one example, the air charge may be controlled by controlling the intake manifold pressure and/or the cam phase (when the engine has a cam phaser or other mechanism for controlling valve timing). However, when available, other mechanism such as adjustable valve lifters, air pressure boosting devices (e.g., turbochargers or superchargers), air dilution mechanisms (e.g., exhaust gas recirculation) or other mechanisms can also be used to help adjust the air charge. In the illustrated example, the desired air charge is indicated in terms of a desired intake manifold pressure (MAP) 31 and a desired cam phase setting 32. When other components are used to help regulate air charge, there may be indicated values for those components as well.

The firing timing determining module 50 is arranged to issue a sequence of firing commands 52 that cause the engine to deliver the percentage of firings dictated by a commanded firing fraction 48. The firing timing determining module 50 may take a wide variety of different forms. By way of example, the firing timing determining module 50 may be a sigma delta converter. The sequence of firing commands (sometimes referred to as a drive pulse signal 52) outputted by the firing timing determining module 50 may be passed to the engine control unit (ECU) 70 or another module such as a combustion controller (not shown in FIG. 1) which orchestrates the actual firings.

When a change in firing fraction is commanded by unit 30, it may be desirable to simultaneously command a change in the cylinder mass air charge (MAC). As discussed above changes in the air charge tend to be realized more slowly than changes in firing fraction can be implemented, due to the latencies inherent in filling or emptying the intake manifold and/or adjusting the cam phase. Transition adjustment unit 40 is arranged to adjust the commanded firing fraction as well as various operational parameters, such as commanded cam phase and commanded manifold pressure during transitions in a manner that mitigates unintended torque surges or dips during the transition. That is, the transition adjustment unit manages at least the target cam phase, one or more other actuators that impact the air charge (e.g. throttle position), and the firing fractions during transitions between commanded firing fractions. It may also control other power train parameters, such as torque converter slip. Typically, the air charge would be managed throughout the transition to maintain the desired cylinder torque output. This could be accomplished by reducing the MAP or MAF using any available actuator(s) such as throttle position.

In some examples, during the firing fraction change, the cam phase preferably continues to transition along the same transition path towards the requested cam phase until the requested cam phase is reached. That is, the cam phase transition is not paused during the firing fraction transitions. However, if desired for control purposes or otherwise, the cam phase may be held constant, or relatively constant, during the firing fraction transition with other variables (such as throttle position and/or manifold pressure) being used as the primary mechanism to vary the air charge as required during the firing fraction transition portion(s) of the overall transition. In examples that begin the firing fraction transition before the target cam phase is actually reached, the actual cam phase range within which the firing fraction change is initiated may vary with the needs of any particular application.

Not all of the intermediate firing fractions will be deemed suitable for use all of the time. Therefore, for the purposes of explanation, consider a circumstance in which the set of available firing fractions includes 1, 4/5, 2/3, 3/5, 1/2, 2/5 and 1/3. In that scenario, the intermediate firing fractions 3/8, 3/7, 4/9, 5/9, 4/7, 3/5, 5/8 are excluded for NVH or some other reason.

When no net torque is required, a DFM controlled engine with the ability to close the intake and exhaust valves can disable all cylinders in deceleration cylinder cut off (DCCO) mode. In the DCCO mode, the cam phase exercises no control over engine operation, since the valves are deactivated, i.e. closed. Consequently, in entering and/or exiting DCCO, no waiting is required for the cam to reach a target position.

In still other examples, transition tables may be provided that predefine the firing fractions that are used based on operating conditions, the original and requested firing fractions, and/or any other desired factors. Regardless of the selection process used, target firing fractions (whether intermediate or not) can be used in some examples, which has the advantage of improving fuel economy during transitions involving large cam phase changes compared to a single stage cam first control strategy.

Unlike optimum cam phase angle, which may move monotonically with engine speed and torque request, desired driveline slip has a complex relationship with respect to firing fraction, engine speed, and torque request. Certain firing frequencies can even excite vehicle resonances or have other undesirable effects. These firing frequencies are generally avoided or use higher driveline slip levels to isolate vehicle occupants from the undesirable NVH. Other firing frequencies may produce little undesirable NVH, and in these cases slip can be zero, e.g., locked-up TCC, or minimal.

Operational slip TCC may be implemented, and may vary based on the requested firing fraction, and optionally, a variety of other operating conditions or operating parameters, for example, engine speed, transmission gear, the magnitude of the torque request, cylinder load, vehicle speed, transmission input shaft speed, driver preferences, road roughness, and/or environmental factors. In some examples, the requested operational slip may be determined by firing fraction and powertrain setting determining unit 30, in accordance with predetermined policies and constraints. For example, the appropriate slip values can be obtained through the use of look-up tables, algorithmically, or via any other suitable approach. However, slip need not be increased during firing fraction transitions.

One of the benefits of introducing relatively small amounts of slip to the drivetrain during normal operation of a vehicle is that the slip tends to dampen engine generated vibrations, thereby reducing passenger perceptible NVH and smoothing the vehicle's ride. A drawback of introducing drivetrain slip is that it tends to slightly reduce fuel efficiency. Therefore, the actual slip values deemed appropriate for different firing fractions and different operating conditions are typically selected as a tradeoff between comfort and fuel efficiency. Thus, as a general rule, the more perceptible NVH a firing fraction/operating condition combination is likely to produce, the higher the associated slip will be.

The firing fraction change may be accomplished using a cam first transition approach or by simultaneously changing the firing fraction and air charge, or in accordance with any other desired transition scheme.

There are a number of different processes that may be used to select the target or commanded firing fraction at any given point. As discussed above, under any particular operating conditions, there will typically be a set of "available" firing fractions and associated powertrain settings that can be used to deliver the desired torque while meeting the designated NVH constraints. Most often, the requested firing fraction will be a fraction that results in the lowest fuel flow or brake specific fuel consumption.

By way of example, in some implementations, a DFM controller 10 will maintain a list that identifies the set of firing fractions that are able to provide the desired engine output within prescribed NVH criteria under the current operating conditions. This list may be considered a list of available firing fractions. When such a list of available firing fractions is used, the transition logic can first look at the slip threshold associated with the lowest available firing fraction to check whether that slip threshold exceeds the current slip. If so, the next higher firing fraction is checked. If not, that firing fraction is selected as the target.

One side effect of increasing driveline slip is that it increases driveline losses, thereby reducing the power delivered to the wheels for a given engine output. Conversely, reducing driveline slip tend to increase power delivered to the wheels for a given engine output. When desired, the engine controller can be configured to adjust the engine output in parallel with commanded driveline slip changes to partially or fully compensate for TCC or other driveline slip based variations in a manner that reduces or eliminates variations in the brake torque delivered to the wheels during selected operating conditions. Accordingly, in certain examples disclosed herein, TCC slip need not be increased, and desired torque may be controlled by controlling manifold pressure more precisely by controlling throttle position with a predetermined relationship with respect to the firing fraction transition, which will be described in more detail below.

Although particular methods have been described to facilitate explanation of the examples herein, it should be appreciated that the actual algorithms or logic used to accomplish the described functions may vary widely and are in no way intended to be limited to the logic flows illustrated in the accompanying flow charts. Rather, various steps and functions may be reordered, altered, added or deleted in accordance with designer preferences and/or the needs of any particular implementation.

As suggested above, it is generally desirable from a drivability standpoint to maintain the torque output relatively smooth during transitions. In many applications the cam phase and the throttle 106 (to control the manifold pressure) are the primary mechanisms to control/vary the air charge in each cylinder 114. Therefore, as the cam phase changes, it is desirable to vary the manifold pressure in a complementary way to maintain a relatively constant air charge through the cam phase change. There are a variety of other ways to vary the air charge, as well, including valve lift control, exhaust gas recirculation techniques, and air boosting techniques, such as turbo-charging and supercharging, by way of example. When the engine includes suitable hardware, any of these air charge control mechanisms can be controlled individually, or in parallel to help control the air charge.

Referring now to FIG. 3, a method 200 of controlling an engine system to deliver a requested engine output torque is provided. The method 200 includes a step 202 of operating an engine at a first firing fraction, a first cam phase, and a first throttle control position. The method 200 then includes a step 204 of determining a desired second firing fraction and a desired second cam phase, such as with the firing fraction and powertrain setting determining unit 30 described in FIG. 2. In this case, the desired second firing fraction is different than the first (current) firing fraction. The method 200 further includes a step 206 of determining a torque request and a step 208 of determining a throttle area. The torque request may be referred to as a driver torque request, but it could alternatively mean another torque request, such as by a cruise control or traction control unit.

The method 200 then includes a step 210 of determining a desired second throttle control position based on at least the throttle area, the torque request, the desired second firing fraction, and the desired second cam phase. More particularly, in this step 210, the method 200 may include constraining the mass air flow rate to achieve the desired torque.

This concept is explained in more detail with reference to FIG. 4. The manifold 104 can be represented using the ideal gas law, shown below in equation 1. (This a mean model and does not comprehend the compressible flow dynamics across the throttle body or in the intake manifold runners.)

$$PV = \frac{m}{M}RT \qquad (1)$$

where P=manifold absolute pressure, V=volume of the intake manifold (typically constant), m=mass of air in the intake manifold 108, M=the molar mass of air (constant), R=the ideal gas constant (which is fixed and relates to the energy and mass of a gas), and T=air temperature in the manifold 108 (assume constant). Assuming V, R, M, and T are constant, the following proportional relationship results:

$$\Delta P(t) \propto \Delta m(t) \qquad (2)$$

and thus it is understood that the change in manifold absolute pressure is proportional to the change in the mass of air in the intake manifold 108. The flow into the manifold 108 is a function of the throttle area (% A) and the pressure ratio across the throttle body 106. The pressure ratio is related to manifold pressure P, and therefore, the relationship can be simplified as follows:

$$\dot{m}_{in}(t) = f(P, \% A) \qquad (3)$$

where $\dot{m}_{in}$=air mass flow rate through the throttle body 106 into the intake manifold 108. The mean flow out of the manifold 108 is a function of the manifold pressure P, Volumetric Efficiency VE, engine speed RPM, and the firing fraction FF. The firing period, or the time between active cylinders, changes with the firing fraction. Therefore, the following relationship exists:

$$\dot{m}_{out}(t) = f(P, VE, FF, RPM) \qquad (4)$$

where $\dot{m}_{out}$=air mass flow rate from the intake manifold 106 into the firing cylinders 114. VE is a function of engine speed RPM, manifold pressure P, and the camshaft position(s). Substituting cam phaser positions into the previous equation results in the following relationship:

$$\dot{m}_{out}(t) = f(P, \text{Phasing}, FF, RPM) \qquad (5)$$

Substituting equations (3) and (5) into equation (2) yields the following relationship:

$$\Delta P(t) \propto \int (\dot{m}_{in}(P, \% A) - \dot{m}_{out}(P, \text{Phasing}, FF, RPM)) dt \qquad (6)$$

The target mass flow rate into the engine is proportional to the power produced by the engine, and therefore is constrained to meet driver requested torque. This is the control target. Cam phasing, firing fraction, and throttle area are control inputs. Engine speed RPM is controllable to an extent, but there are many noise factors influencing engine speed. Engine speed RPM is comprehended by the feed-forward control and treated as a noise factor in the feedback control.

Assuming a constant torque/power request when the firing fraction changes, the manifold pressure and/or the camshaft phasing must change in order to maintain a constant air mass flow into the engine. Further, cam phasing may be considered constrained because it is desirable to operate the camshaft in the position that yields the best fuel economy. Accordingly, the cam phaser cannot be used to balance the fraction change long-term. If the throttle is perfectly sealed, the pressure in the manifold will decrease proportionally to the mass flow rate into the engine, as represented in equation (7):

$$\Delta P(t) \propto \int -\dot{m}_{out}(t) dt \qquad (7)$$

Therefore, if the manifold pressure changes proportionally to the change in firing fraction, torque disturbances are minimized or eliminated. For example, referring now to FIG. 5, a graph 300 illustrating various parameters as a function of time. A trace 302 for air per cylinder is directly related to manifold pressure P. In this example, as the delivered fraction 304 is increased, manifold pressure P, or air per cylinder 304, is proportionally decreased. The manifold pressure P is controlled by controlling the throttle position, or throttle control fraction 306, as explained above. Thus, referring to FIGS. 3 and 5, the method 200 includes a step 212 of transitioning from the first firing fraction (at 308 in FIG. 5) to the desired second firing fraction (at 310 in FIG. 5) while transitioning from the first throttle control position (at 312 in FIG. 5) to the desired second throttle control position (at 314 in FIG. 5). The firing fraction transition from a first firing fraction 308 to the desired second firing fraction 310 is completed while completing a throttle transition from the first throttle control position 312 to the desired second throttle control position 314, the firing fraction transition and the throttle transition are completed with a predetermined relationship with respect to each other. In some cases, the predetermined relationship could be linear, and in other cases, the predetermined relationship may be nonlinear. The control is completed with phase-lead and with a proportional feedback error.

By controlling the throttle control 306 in a predetermined relationship with respect to the transition of the delivered fraction 304, the throttle 316 behaves as shown due to latencies in the manifold. But even so, the response can be predicted so that the engine output torque 318 is controllable and implemented substantially as requested. In this case, the torque 318 is able to be held constant through the entire firing fraction transition, even without the use spark retard. Thus, the method 200 may include implementing a delivered torque that is substantially the same as the torque request while transitioning from the first firing fraction to the second firing fraction.

The transition time must be faster than the noise and vibration limit and slower than the maximum manifold pump down rate. In practice it is best to maintain a safety margin from both limits.

A hybrid feed-forward and feedback control system is used to manage torque during DFM transitions. This control strategy augments a baseline torque control system, such as that described in U.S. Pat. No. 9,175,628, hereby incorporated by reference in its entirety, which also has both feedforward and feedback components. If the requested torque is constant, the steady-state throttle position is relatively constant for all firing fractions, such as shown at 318 in FIG. 5. However, if the requested torque is being varied, then torque will be controlled to substantially match the torque request, and to do, the throttle control fraction 306 will need to be raised or lowered.

Phase-lead compensation is recommended to overcome latencies in the system and achieve the required manifold pressure change 302.

Figure 6:
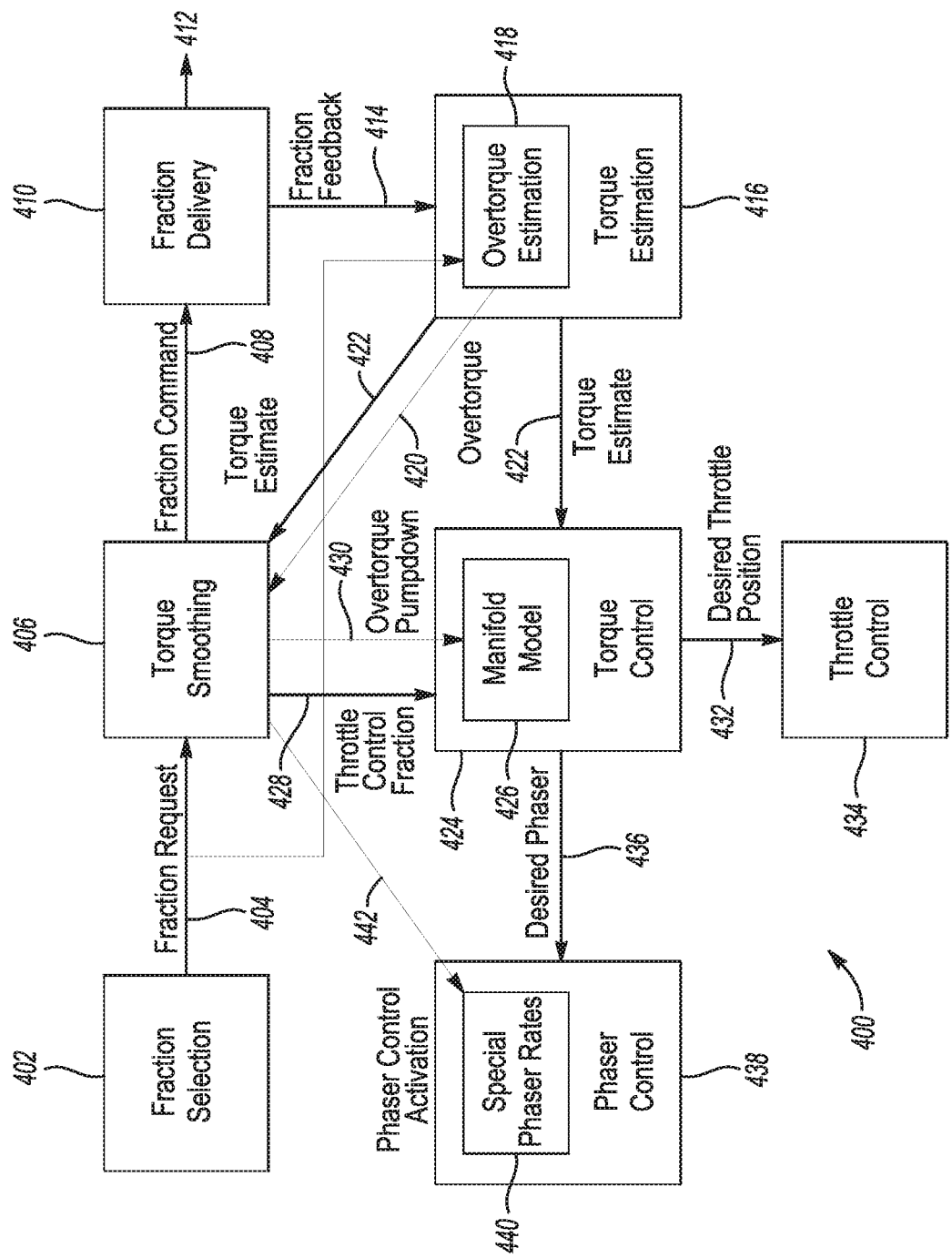
FIG. 6 is a functional block diagram illustrating a control system illustrating a control structure configured to control an engine using DFM, according to the principles of the present disclosure.

Referring now to FIG. 6, the firing fraction transition control may be integrated into the existing torque control system. FIG. 6 generally illustrates an example of a control system 400, which may be included in various portions or one portion of the system illustrated in FIG. 2. The control system 400 includes a fraction selector 402, which may be identical to the unit 30 described above. In any event, the fraction selector 402 may select the firing fraction in any desirable way. The fraction selector 402 then outputs a fraction request 404 to a torque smoother 406, which will be described in greater detail below. The torque smoother 406 outputs a fraction command 408 to a fraction deliverer 410 to be implemented by the engine pistons/cylinders, and which may result in a change in the firing fraction. Thus, the fraction deliverer 410 outputs the fraction delivery 412 to an actuator for implementation, and the fraction deliverer 410 also outputs a fraction feedback 414 to a torque estimator 416.

The torque estimator 416 estimators the amount of engine torque needed to effectuate a requested torque based on the firing fraction feedback 414. In addition, the torque estimator 416 has an over-torque estimator 418, which may be integral to, combined with, or separate from the torque estimator 416. The over-torque estimator 418 estimates transition over-torque, which may be defined as an extra amount of torque that would have been applied at the second firing fraction without transitioning to the desired second throttle control position. The over-torque estimation 420 is based on part on the fraction request 404. Both the over-torque estimate 420 and the torque estimate 422 are provided to the torque smoother 406. The torque estimate 422 is also provided to a torque controller 424. The torque controller 424 includes a manifold model 426, which may be based on the manifold model described in FIG. 4 with equations (1)-(7), or it may be based on lookup tables or any other suitable model. For example, the manifold model may be configured to apply a high gain to the manifold pressure control (controlled by throttle) to react quickly to a changing firing fraction in order to thereby control torque.

The torque smoother 406 provides the throttle control fraction 428 to the torque controller 424, and the torque smoother 406 provides an over-torque pumpdown 430 to the manifold model 426 within the torque controller 424. Thus, the torque controller 424 determines a desired throttle position 432 desirable for controlling torque as requested. The desired throttle position 432 may be determined based in part on the manifold model 426, the torque request, the firing fraction, and also cam phasing, if desired. The desired throttle position 432 is then provided to a throttle control actuator 434 to effectuate the throttle control in accordance with the present disclosure.

The torque controller 424 also determines a desired phaser 436 and sends the desired phaser 436 to a phaser controller 438. The phaser controller 438 contains a special phaser rates module 440, which obtains special phaser rates 442 from the torque smoother 406. Thus, the torque smoother 406 has an effect on the ultimate phaser controller 438 that actuates the cam phaser(s).

Figure 7:
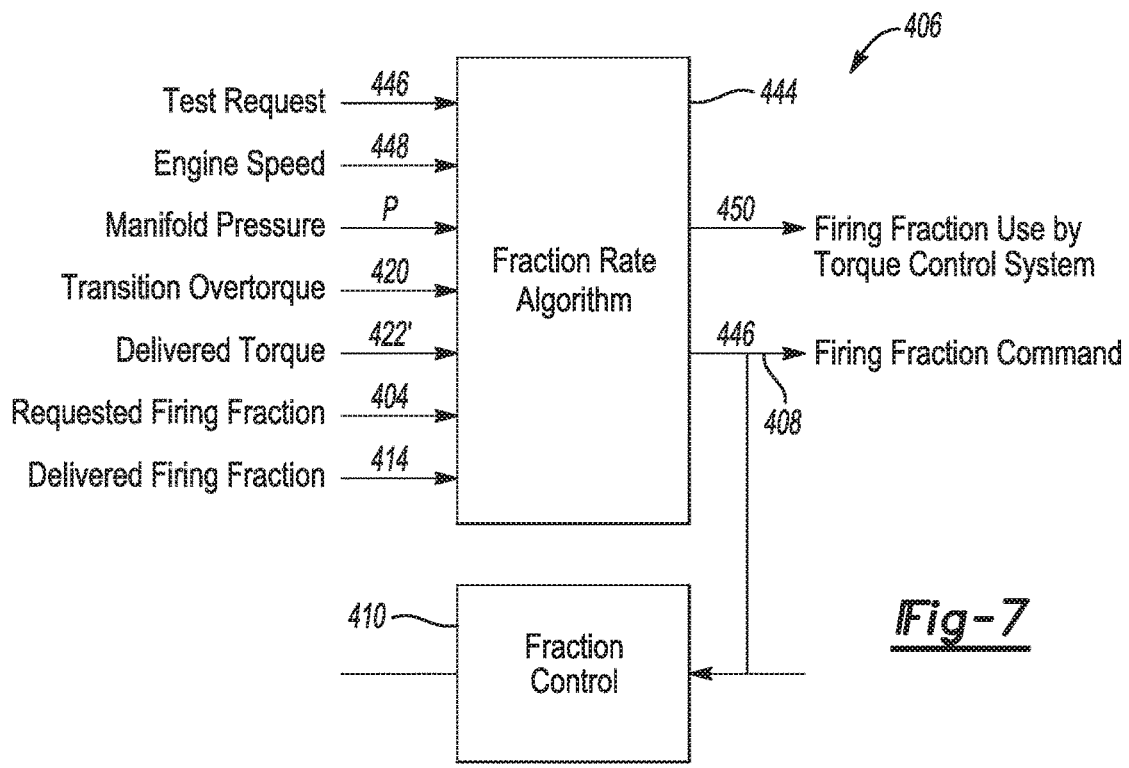
FIG. 7 is a functional block diagram illustrating a portion of the control system of FIG. 6, in accordance with the principles of the present disclosure.

Referring now to FIG. 7, contents of the torque smoother 406 are illustrated. The torque smoother 406 may contain a fraction rate determiner 444 configured to determine the fraction rate, or fraction command 408, based on a number of input parameters. For example, inputs to the fraction rate determiner 444 include a torque request 446, engine speed 448, manifold pressure P, the transition over-torque estimation 420, the actual (or estimated) delivered torque 422', the requested firing fraction 404, and the delivered firing fraction 414. The torque request 446 may be based on, for example, driver input, torque control input, and/or cruise control input, as described above. The delivered firing fraction 414 may be provided by the fraction delivery controller 410, which may be sent through the torque estimator 416. In addition to outputting the firing fraction command 408, the fraction rate determiner 444 outputs a firing fraction command 450 to be used by the torque control system. In other words, the firing fraction command 450 is predicted early and provided to the torque controller 424 to effectuate a fast reaction time.

The fraction rate determiner 444 calculates the required relative phasing of the firing fraction command 408 sent to the fraction control subsystem 410 and the torque control subsystem 424. The phasing is calculated to compensate for manifold filling dynamics and actuator response delays. That phasing algorithm uses the latency between the firing fraction command 408 and the delivered firing fraction 414. In addition to the feedforward control, there may be low gain proportional feedback loops for delivered torque error and calculated over-torque that modify both rates.

The baseline torque feedback control system is left active during transitions. This provides some of the control effort, and avoids problems re-initializing the closed-loop controller states after the transition. An additional manifold pressure based feedback controller is used during transitions to increase control bandwidth (and to increase system gain).

Accordingly, determining the desired throttle control position may ultimately be based on torque request 446, engine speed 448, manifold pressure P, the transition over-torque estimation 420, the delivered torque 422', the requested firing fraction 404, and the delivered firing fraction 414, by way of example.

Thus, in some examples, the method 200 may, and the control system may be configured to, determine a first manifold pressure at the first firing fraction and a desired second manifold pressure at the second firing fraction, where the desired second manifold pressure being based on the torque request, the second throttle control position being controlled based on the desired second manifold pressure, and the desired second manifold pressure being controlled based on at least the throttle area, the torque request, the desired second firing fraction, and the desired second cam phase.

Figure 8:
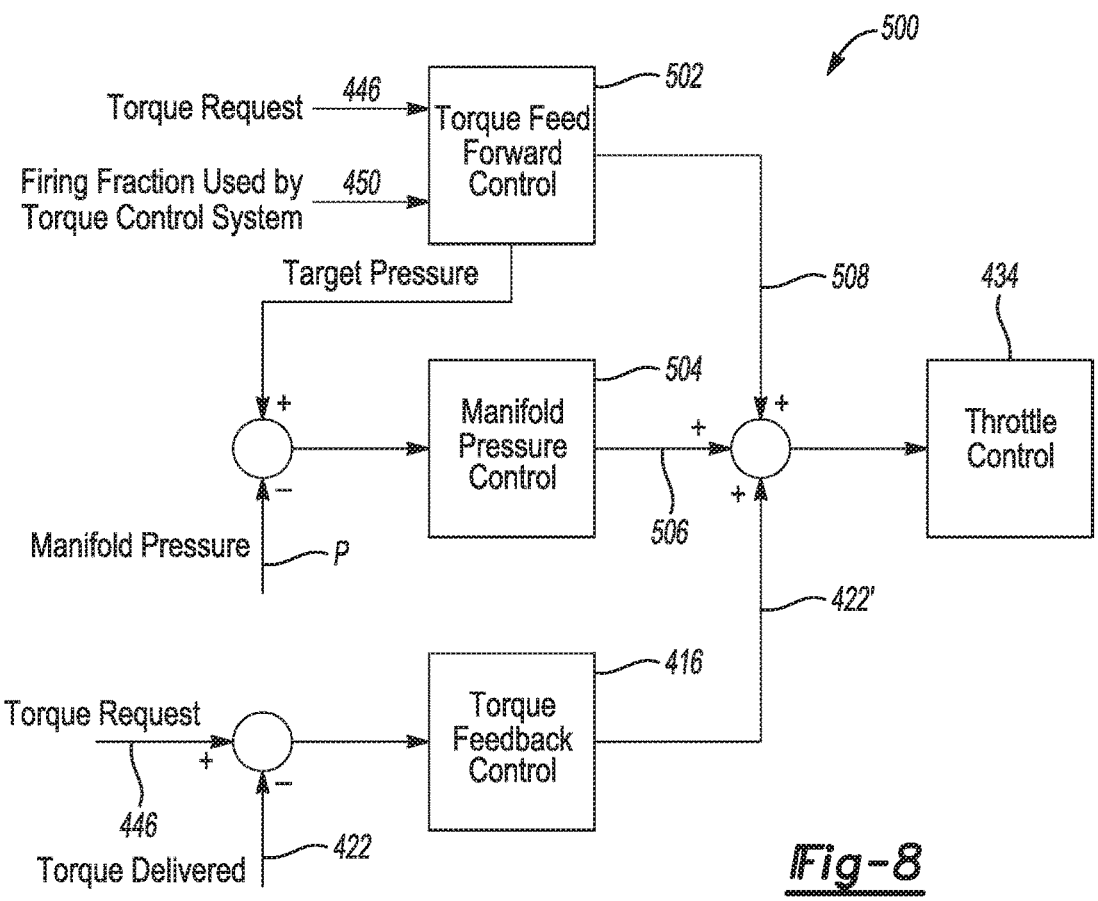
FIG. 8 is a functional block diagram illustrating a portion of the control system of FIG. 6, according to the principles of the present disclosure.

Referring now to FIG. 8, manifold pressure feedback may be implemented by the modules in FIG. 6 and is generally designated at 500. The manifold pressure feedback control system 500 compares the target manifold pressure to the current manifold pressure P and calculates the necessary throttle position correction. The target manifold pressure is calculated by the feedforward torque control system 502 using the same phase-lead as the rest of the torque control system 424. The manifold pressure feedback controller 504 outputs a correction factor 506 that is added to the output 508 of the existing feedforward and feedback control system 502, then commanded to the throttle 434. Of course, the torque feed forward control system takes a torque request 446 and the early firing fraction information 450 used by the torque control system 426 and provides the torque output 508 based on a model or lookup tables, by way of example. The torque estimation module 416 also provides torque feedback control 422' as input to the throttle controller 434.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of controlling an engine system to deliver a requested engine output torque, the method comprising:
   operating an engine at a first firing fraction, a first cam phase, and a first throttle control position;
   determining a desired second firing fraction and a desired second cam phase, the desired second firing fraction being different than the first firing fraction;
   determining a torque request;
   determining a throttle area;
   determining a desired second throttle control position based on at least the throttle area, the torque request, the desired second firing fraction, and the desired second cam phase; and
   completing a firing fraction transition from the first firing fraction to the desired second firing fraction while completing a throttle transition from the first throttle control position to the desired second throttle control position, wherein each of the firing fraction transition and the throttle transition are completed with a predetermined relationship with respect to each other by constantly maintaining a proportional relationship between a delivered firing fraction and a manifold pressure during the entire firing fraction transition.

2. The method of claim 1, further comprising implementing a delivered torque that is substantially the same as the torque request while transitioning from the first firing fraction to the desired second firing fraction.

3. The method of claim 1, further comprising determining an engine speed, wherein the step of determining the desired second throttle control position is further based on the engine speed.

4. The method of claim 2, wherein the desired second firing fraction is determined based on at least the torque request, a manifold pressure, a transition over-torque estimation, and the delivered torque, the transition over-torque estimation being defined as an extra amount of torque that would have been applied at the desired second firing fraction without transitioning to the desired second throttle control position.

5. The method of claim 1, wherein at least one of the first firing fraction and the desired second firing fraction is selected from the following group of firing fractions: 1/8, 1/7, 1/6, 1/5, 1/4, 1/3, 2/9, 2/7, 2/5, 2/3, 3/8, 3/7, 3/5, 3/4, 4/7, 4/5, 5/9, 5/8, 5/7, 5/6, 6/7, 7/9, 7/8, and 8/9.

6. An engine control system arranged to direct dynamically fuel management of an engine, the engine control system having at least one controller configured to:
   operate the engine at a first firing fraction, a first cam phase, and a first throttle control position;
   determine a desired second firing fraction and a desired second cam phase, the desired second firing fraction being different than the first firing fraction;
   determine a torque request;
   determine a throttle area;
   determine a desired second throttle control position based on at least the throttle area, the torque request, the desired second firing fraction, and the desired second cam phase; and
   complete a firing fraction transition from the first firing fraction to the desired second firing fraction while completing a throttle transition from the first throttle control position to the desired second throttle control position, wherein each of the firing fraction transition and the throttle transition are completed with a predetermined relationship with respect to each other by constantly maintaining a proportional relationship between a delivered firing fraction and a manifold pressure during the entire firing fraction transition.

7. The engine control system of claim 6, the at least one controller being further configured to implement a delivered torque that is substantially the same as the torque request while transitioning from the first firing fraction to the desired second firing fraction.

8. The engine control system of claim 6, the at least one controller being further configured to determine an engine speed, wherein the at least one controller is configured to determine the desired second throttle control position further based on the engine speed.

9. The engine control system of claim 7, wherein the at least one controller is configured to determine the desired second firing fraction based on at least the torque request, a manifold pressure, a transition over-torque estimation, and the delivered torque, the transition over-torque estimation being defined as an extra amount of torque that would have been applied at the desired second firing fraction without transitioning to the desired second throttle control position.

10. The engine control system of claim 6, wherein at least one of the first firing fraction and the desired second firing fraction is selected from the following group of firing fractions: 1/8, 1/7, 1/6, 1/5, 1/4, 1/3, 2/9, 2/7, 2/5, 2/3, 3/8, 3/7, 3/5, 3/4, 4/7, 4/5, 5/9, 5/8, 5/7, 5/6, 6/7, 7/9, 7/8, and 8/9.

11. The engine control system of claim 6, wherein the controller is configured to complete the firing fraction transition without using spark retard under any circumstances.

12. A vehicle system comprising:
   an engine having a plurality of pistons, each piston slidable within a cylinder bore, and a cam configured to control the flow of air and fuel into each cylinder bore;
   a throttle configured to control a flow of fluid into the engine; and
   a control system having at least one controller configured to:
      operate the engine at a first firing fraction, the cam at a first cam phase, and the throttle at a first throttle control position;
      determine a desired second firing fraction and a desired second cam phase, the desired second firing fraction being different than the first firing fraction;
      determine a torque request;
      determine a throttle area through the throttle, the throttle area being selectively variable;
      determine a desired second throttle control position based on at least the throttle area, the torque request, the desired second firing fraction, and the desired second cam phase; and
      complete a firing fraction transition from the first firing fraction to the desired second firing fraction while completing a throttle transition from the first throttle control position to the desired second throttle control position, wherein each of the firing fraction transition and the throttle transition are completed with a predetermined relationship with respect to each other by constantly maintaining a proportional relationship between a delivered firing fraction and a manifold pressure during the entire firing fraction transition.

13. The vehicle system of claim 12, the at least one controller being further configured to implement a delivered torque that is substantially the same as the torque request while transitioning from the first firing fraction to the desired second firing fraction.

14. The vehicle system of claim 12, the at least one controller being further configured to determine an engine speed, wherein the at least one controller is configured to determine the desired second throttle control position further based on the engine speed.

15. The vehicle system of claim 13, wherein the at least one controller is configured to determine the desired second firing fraction based on at least the torque request, a manifold pressure, a transition over-torque estimation, and the delivered torque, the transition over-torque estimation being defined as an extra amount of torque that would have been applied at the desired second firing fraction without transitioning to the desired second throttle control position.

16. The vehicle system of claim 12, wherein at least one of the first firing fraction and the desired second firing fraction is selected from the following group of firing fractions: $1/8$, $1/7$, $1/6$, $1/5$, $1/4$, $1/3$, $2/9$, $2/7$, $2/5$, $2/3$, $3/8$, $3/7$, $3/5$, $3/4$, $4/7$, $4/5$, $5/9$, $5/8$, $5/7$, $5/6$, $6/7$, $7/9$, $7/8$, and $8/9$.

17. The vehicle system of claim 12, wherein the controller is configured to complete the firing fraction transition without using spark retard under any circumstances.

* * * * *